United States Patent [19]

Yoshinaga et al.

[11] Patent Number: 5,011,623
[45] Date of Patent: Apr. 30, 1991

[54] NONLINEAR OPTICAL MATERIAL AND NONLINEAR OPTICAL DEVICE

[75] Inventors: Kazuo Yoshinaga, Machida; Takashi Kai, Hadano; Koichi Egara, Tokyo; Yomishi Toshida, Yokohama; Hideaki Mitsutake, Tokyo; Koichi Sato, Atsugi; Takeshi Miyazaki, Ebina, all of Japan

[73] Assignee: Canon Kabushiki Kaisha, Tokyo, Japan

[21] Appl. No.: 381,277

[22] Filed: Jul. 18, 1989

[30] Foreign Application Priority Data

Jul. 20, 1988 [JP] Japan .................. 63-179097
Dec. 30, 1988 [JP] Japan .................. 63-334239

[51] Int. Cl.⁵ .......................... C09K 19/54
[52] U.S. Cl. .................. 252/299.5; 252/582; 252/587; 252/299.01; 428/1; 350/354; 350/350 S; 350/96.12
[58] Field of Search ............ 428/1; 252/299.01, 299.5, 252/582, 587, 584, 589; 350/354, 96.12, 350 S

[56] References Cited

U.S. PATENT DOCUMENTS

| | | | |
|---|---|---|---|
| 4,661,576 | 4/1987 | Decobert et al. | 526/298 |
| 4,894,263 | 1/1990 | Dubois et al. | 428/1 |
| 4,909,964 | 3/1990 | Clement et al. | 252/589 |
| 4,913,836 | 4/1990 | East | 252/299.01 |
| 4,913,839 | 4/1990 | Uchida et al. | 252/299.01 |
| 4,913,844 | 4/1990 | DeMartino et al. | 252/582 |
| 4,915,491 | 4/1990 | DeMartino et al. | 350/350 S X |
| 4,935,292 | 6/1990 | Marks et al. | 252/582 X |
| 4,937,013 | 6/1990 | Buckley et al. | 252/299.01 |
| 4,944,896 | 7/1990 | DeMartino et al. | 252/587 |

FOREIGN PATENT DOCUMENTS

| | | |
|---|---|---|
| 0184482 | 6/1986 | European Pat. Off. |
| 0338845 | 4/1989 | European Pat. Off. ......... 252/299.5 |
| 63-204235 | 8/1988 | Japan |
| 64-90414 | 4/1989 | Japan |

OTHER PUBLICATIONS

Griffin, A. C. et al., S.P.I.E., vol. 682, p. 65, 1986.
Shtykou, N. M. et al., M.C.L.C., 124,379, 1985.
Williams, D. J., Angew. Chem. Int. Ed. Engl. 23(1984), 690–703. Macromolecules, vol. 15, (1982) 1385–1389

Primary Examiner—Robert L. Stoll
Assistant Examiner—Richard Treanor
Attorney, Agent, or Firm—Fitzpatrick, Cella, Harper & Scinto

[57] ABSTRACT

A nonlinear optical material is provided by mixing a polymer liquid crystal having a chiral center and a nonlinear optical compound. The polymer liquid crystal may be a ferroelectric polymer liquid crystal. The nonlinear optical material is preferably in the form of a solid solution. A nonlinear optical device is formed by orienting the nonlinear optical material to provide an optical member.

6 Claims, 1 Drawing Sheet

NONLINEAR OPTICAL MATERIAL AND NONLINEAR OPTICAL DEVICE

FIELD OF THE INVENTION AND RELATED ART

The present invention relates to a nonlinear optical material and a device formed therefrom, more particularly to a nonlinear optical material suitable for a waveguide in the form of a film or fiber.

Heretofore, as nonlinear optical materials, inorganic single crystals of KDP, $LiNbO_3$, etc., and organic single crystals of urea, etc., have been known and used, e.g., for a wavelength conversion element for laser. However, it is technically difficult to obtain such a single crystal in a large size, and such a single crystal cannot be obtained at a low cost.

Further, it has been known that if a waveguide in the form of a film or fiber is composed of a nonlinear optical material, an improved nonlinear optical effect is attained, because incident light can be converged. It is however difficult to form such a single crystal into a waveguide in a shape as described above. In case of $LiNbO_3$, for example, diffusion exchange of Ti and H has been exercised, and such is time-consuming and is accompanied with a different control.

On the other hand, it has been tried to obtain a large size of single crystal in the form of a film or fiber through vapor deposition or zone melting in a capillary (Nayay, B.K.; ACS sym., 153 (1983)). By this method, however, it is not easy to control the growth of single crystal in a direction capable of phase matching required for effectively providing second harmonic generation (abbreviated as "SHG") or third harmonic generation (abbreviated as "THG").

As described above, a nonlinear optical device consisting of a single crystal is accompanied with problems in respects of workability of processability, production cost, etc. As a means for solving such problems, it has been proposed to prepare a nonlinear optical device by dispersing a minute nonlinear optical compound (generally called a "guest compound") in an oriented form in a polymer (generally called a "host polymer").

An example of such an optical material comprising a host polymer and a guest compound has been prepared by dissolving an azo colorant in polymethyl methacrylate resin to form a film, heating the film to above the glass transition temperature and cooling the film under application of an electric field to orient the azo colorant and fix the structure. A nonlinear optical constant of $6 \times 10^{-9}$ esu was reported for the material (Singer, K.D., Sohn, J.E. and Lalama, S.J.; Appl. Phys. Lett., 49, page 248 (1986)).

Further, Japanese Laid-Open Patent Application (Kokai) No. 84139/1987, for example, discloses a nonlinear optical device comprising acrylamide resin as a host polymer and a nonlinear optical-responsive organic compound as a guest compound.

Further, Japanese Laid-Open Patent Application (KOKAI) No. 45519/1982 and U.S. Pat. No. 442887 also disclose a device comprising a host polymer and a guest compound of a nonlinear optical-responsive organic compound.

Further, Japanese Laid-Open Patent Application No. 246962/1987 discloses a device comprising a compound having a chiral center (guest compound) grown in polyoxyalkylene oxide (host polymer).

A material comprising a host polymer and a guest compound as described above is better than a single crystal material in respect of processability and production cost and is suitable for device formation.

However, such a guest-host complex material involves problems as follows. Thus, in order to provide a device with a large nonlinear optical effect, it is required to increase the content of a guest compound in a solid solution (guest-host complex). It is however difficult to blend a low-molecular weight compound as a guest in a large amount, e.g., at least 20 wt. % or more, with a host polymer uniformly on a molecular level, so that the guest molecule is liable to cause a defect of local phase-separation or crystallization.

Further, such a guest-host blend polymer is liable to lose the flexibility of the polymer per se and result in a remarkable decrease in a mechanical strength when the content of the low-molecular weight polar guest compound is increased.

Further, as for the second order nonlinear optical effect, a guest molecule which per se has a large polarization $\beta$ can show no or only a slight SHG activity when blended in a conventional polymer, if it is a centrosymmetric crystal. For this reason, it has been generally necessary to form the polymer blend into a film and orient the film as by application of an electric or magnetic field or by stretching.

Particularly, in the systems proposed heretofore, a good molecular orientation or a large nonlinear susceptibility could not be obtained because the electric field energy is smaller than the thermal energy as described in the above-mentioned report by Singer, K.D. In order to solve such a problem, it has been proposed to use a mesomorphic polymer, i.d., polymer showing a liquid crystal property, or a polymer liquid crystal as a host polymer.

For example, it was tried to use a polymer liquid crystal as a host and polar molecules as a guest and utilize the orientation under electric field of the polymer liquid crystal to align the polar molecules. As a result SHG was observed under application of an electric field (Meredity, G.R., et al.; Macromolecules, 15, 1385 (1982)).

Further, in order to solve the above problem, it has been also proposed to provide a mesomorphic polymer per se with a nonlinear optical characteristic and dispense with a guest compound. For example, Japanese Laid-Open Patent Applications (KOKAI) Nos. 190230/1987, 190223/1987, 190208/1987 and 201419/1987 disclose polyvinyl-type polymers, polyoxyalkyl-type polymers, polycyclohexane-type polymers, etc., as mesomorphic polymers showing nonlinear optical characteristic.

Even such a material comprising a mesomorphic polymer is insufficient in molecular orientation and nonlinear optical effect arising from such orientation so that it has not provided a large nonlinear optical effect.

Further, Japanese Laid-Open Patent Application (KOKAI) No. 204235/1988 discloses a nonlinear optical device using a ferroelectric side chain-type polymer liquid crystal showing chiral smectic C phase as a core or a cladding part of an optical fiber in order to provide a non-centrosymmetrical orientation. However, no molecular structure showing a large nonlinearity has been introduced, and the nonlinear optical susceptibility obtained thereby is only on the order of ten times that of an amorphous polymer doped with dimethylaminonitrostilbene and oriented under an electric field.

SUMMARY OF THE INVENTION

An object of the present invention which has been accomplished to solve the above-mentioned problems accompanying the prior art, is to provide a nonlinear optical material in the form of a solid solution comprising an organic guest compound having a large nonlinear polarizability uniformly dissolved in a host polymer liquid crystal, wherein the second order or third order nonlinear optical effect of the organic guest compound is not lowered by mixing with the host polymer liquid crystal, and which solid solution retains flexibility even if the organic guest compound is contained in a large amount, thus being excellent in mechanical strength and processability.

Another object of the present invention is to provide a nonlinear optical material in the form of a solid solution showing a large SHG, which comprises a blend of a host polymer liquid crystal and an organic guest compound which per se has a large second-order hyperpolarizability $\beta$ but shows no SHG activity because of its centrosymmetric crystallinity.

A further object of the present invention is to provide a nonlinear optical material having a large degree of non-centrosymmetrical orientation, showing a large nonlinear susceptibility and showing a good processability.

A still further object of the present invention is to provide a nonlinear optical device comprising a member formed of such a nonlinear optical material in an oriented state, which is easy to prepare and possesses excellent memory characteristic and switching characteristic.

According to an aspect of the present invention, there is provided a nonlinear optical material, comprising: a polymer liquid crystal having a chiral center and a nonlinear optical compound. In a preferred embodiment, the polymer liquid crystal may be a ferroelectric one. The nonlinear optical compound may preferably have a second-order hyperpolarizability or nonlinear optical susceptibility of $10 \times 10^{-30}$ esu or higher.

According to another aspect of the present invention, there is provided a nonlinear optical device comprising an optical member comprising a nonlinear optical material as described above in an oriented form.

These and other objects, features and advantages of the present invention will become more apparent upon a consideration of the following description of the preferred embodiments of the present invention taken in conjunction with the accompanying drawing.

DESCRIPTION OF THE PREFERRED EMBODIMENTS

Figure 1:
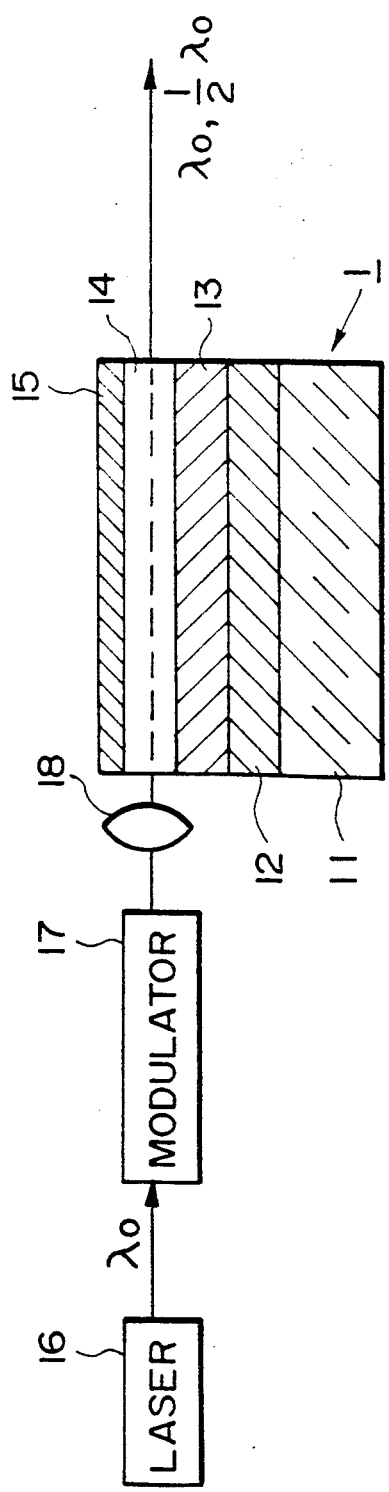
FIG. 1, a sole figure in the drawing, is a schematic illustration of an optical modulation system including a sectional view of a film waveguide as an embodiment of the nonlinear optical device according to the present invention.

The nonlinear optical material according to the present invention is considered to show good orientation and nonlinearity for the following reasons.

A polymer liquid crystal having a chiral center lacks a center of inversion symmetry in its liquid crystal state so that it generally provides a polar component parallel to its two fold axis of rotation symmetry. This is important to second-order nonlinear optics. Because of the presence of such a polar component, the host polymer itself is provided with a second-order nonlinear susceptibility and provides a good nonlinearity of the material as a whole in combination with the nonlinearity of a guest compound.

Incidentally, conventional host polymer liquid crystals as described above (e.g., those reported by Meredity, G.R., et al.) are those having no chiral center.

The organic guest compound having a nonlinear optical characteristic used in the present invention may preferably have a second-order hyperpolarizability or molecular nonlinear optical susceptibility of $10 \times 10^{-30}$ esu or higher (as measured by measurement method, e.g., disclosed by J. L. Oudar, The Journal of Chemical Physics, 67, 446 (1977)), so that the organic guest compound is effectively oriented in response to an electric field accompanying the orientation of the polymer liquid crystal having a chiral center. More preferably, the organic guest compound may have a second-order nonlinear susceptibility of $20 \times 10^{-30}$ esu or higher.

It is preferred that the organic nonlinear optical guest compound has an anisotropy arising from its molecular shape which is coincident with the anisotropy of its transition moment. If this is satisfied, control for phase matching becomes easy and an increased freedom in device formation is attained. The coincidence of the anisotropies of the nonlinear optical compound can be estimated from its dichroic ratio, which may preferably be 0.3 or more.

In case where the polymer liquid crystal having a chiral center shows ferroelectricity providing a chiral smectic phase, such as Sm*C, SmH*, SmI*, etc., it shows a memory characteristic and greatly contributes to the stability with elapse of time of the nonlinearity of the nonlinear optical material according to the present invention. In fact, the nonlinearity of the nonlinear optical material according to the present invention comprising a ferroelectric polymer liquid crystal and a nonlinear optical compound is restored semi-permanently at room temperature.

The polymer liquid crystal having a chiral center used in the present invention may be a side chain-type polymer liquid crystal having a mesogen unit in its side chain or a main chain-type polymer liquid crystal having a mesogen unit in its main chain. Specific examples of such a side chain-type polymer liquid crystal may include those represented by the following formulas (1)-(20), wherein * denotes the location of a chiral center (an asymmetric carbon atom), $n1 = 5-1000$, $n2 = 5-5000$, R is H, Cl or $CH_3$, $m1 = 2-10$, $m2 = 2-15$, $m3 = 0-30$, $p1 = 1-10$, $p2 = 1-10$, $p3 = 1-15$, $p4 = 1-20$, and $p5 = 1-20$. It is particularly preferred to use a ferroelectric polymer liquid crystal represented by the formulas (13)-(20) appearing hereinafter.

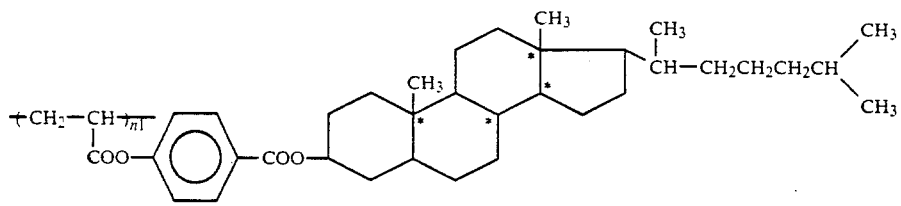
(1)
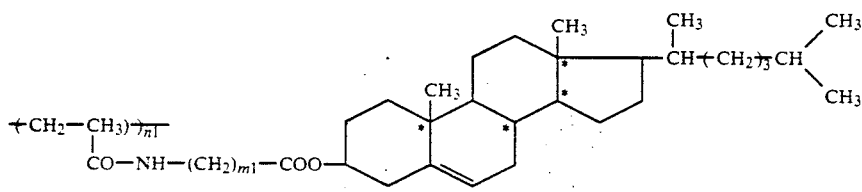
(m1 = 2-10)
(2)
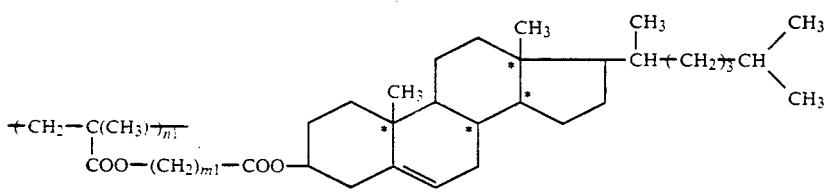
(m1 = 2-10)
(3)
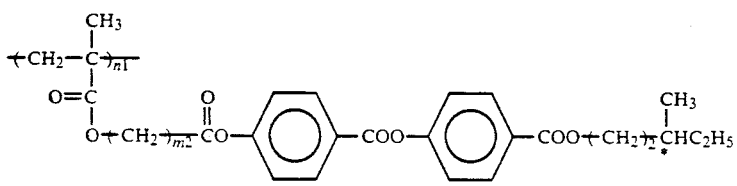
(m2 = 2-15)
(4)
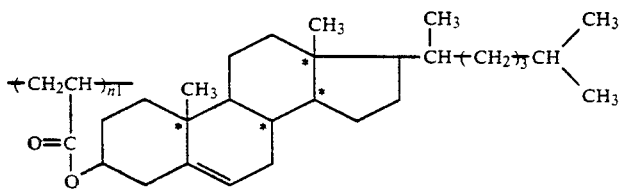
(5)
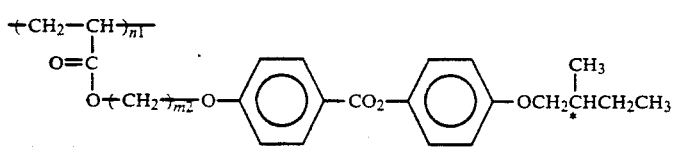
(m2 = 2-15)
(6)
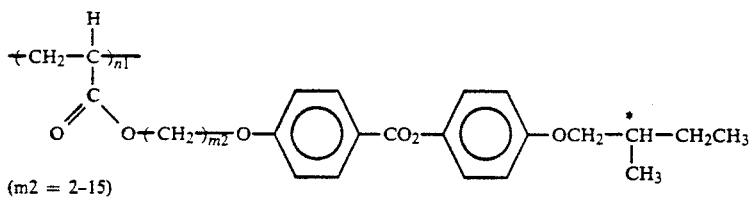
(m2 = 2-15)
(7)
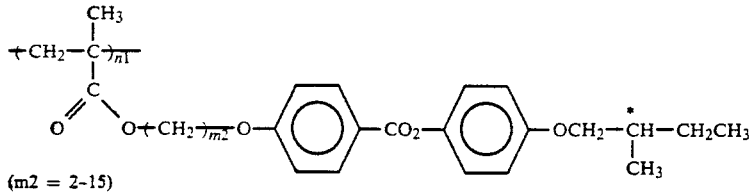
(m2 = 2-15)
(8)

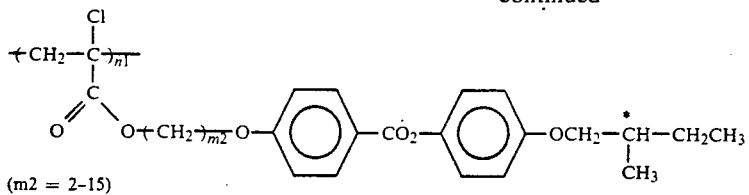
(9)
(m2 = 2-15)
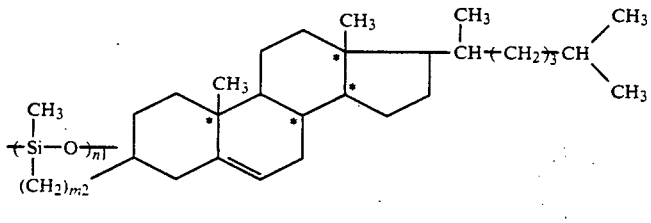
(10)
(m2 = 2-15)
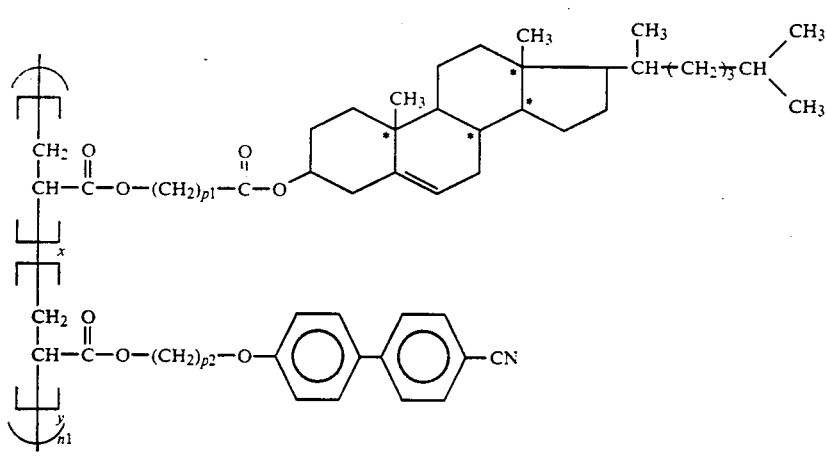
(11)
(x + y = 1, p1 = 1-10, p2 = 1-10)
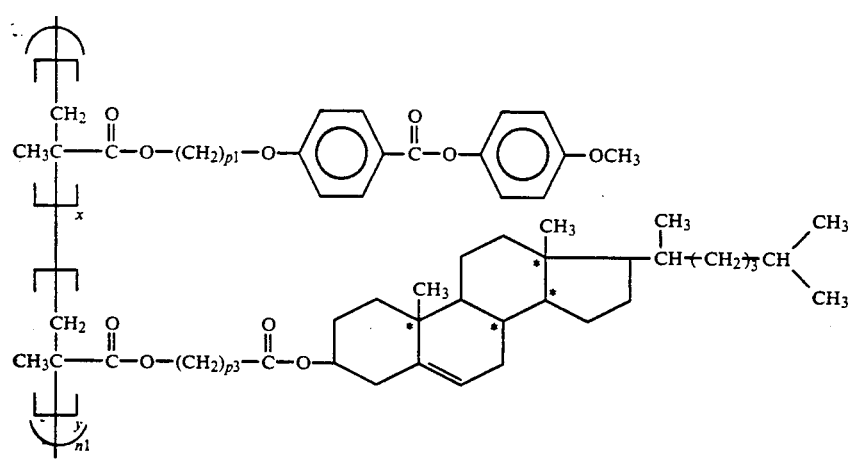
(12)
(x + y = 1, p1 = 1-10, p3 = 1-15)
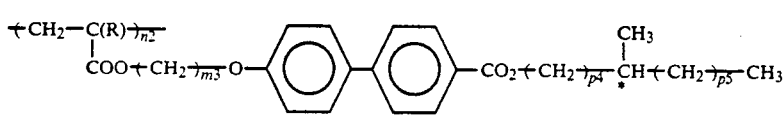
(13)
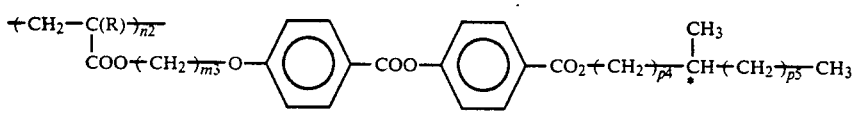
(14)

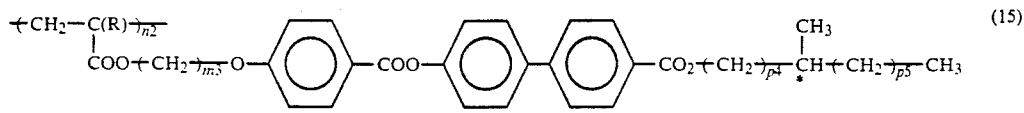 (15)
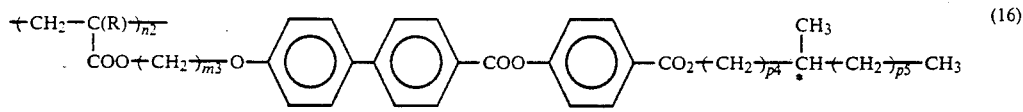 (16)
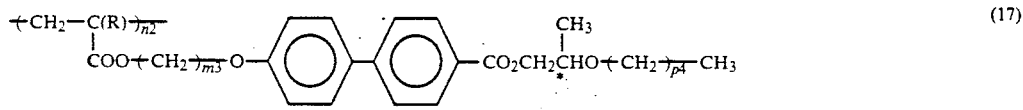 (17)
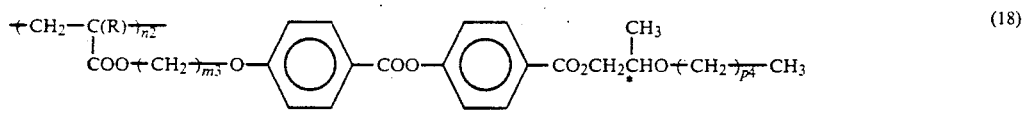 (18)
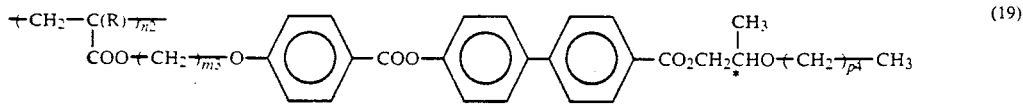 (19)
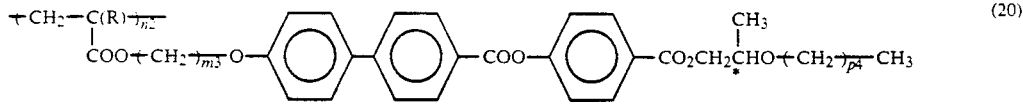 (20)
Examples of the main chain-type polymer liquid crystal having a chiral center may include those represented by the following formulas (21)–(34), wherein * denotes a chiral center and n is 5–1000. It is particularly preferred to use a ferroelectric polymer liquid crystal represented by the formula (34) appearing hereinafter.
 (21)
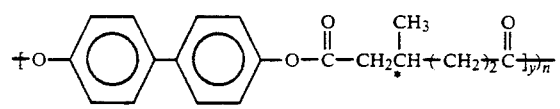
(m2 = 2–15, x + y = 1)
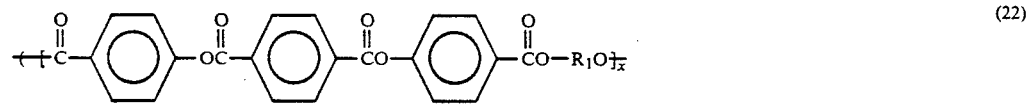 (22)
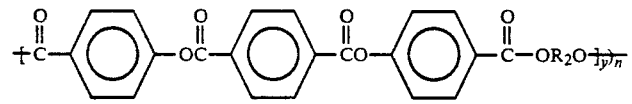
(x + y = 1, m2 = 2–15)
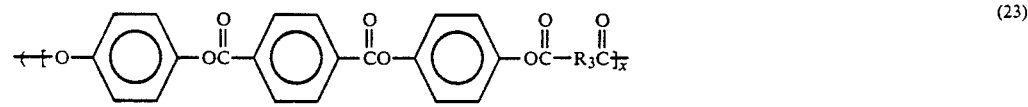 (23)

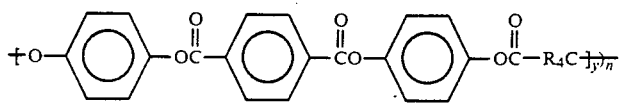
$R3 = -CH_2\overset{*}{\underset{|}{CH}}-CH_2\overline{)_2}$   $CH_3$   $R4 = (CH_2)_{\overline{m2}}$
(x + y = 1, m2 = 2-15)
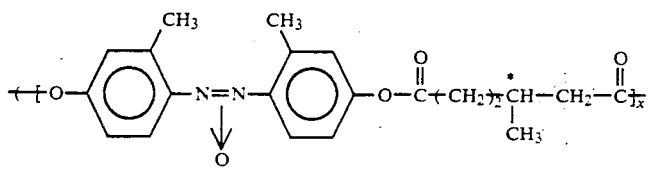 (24)
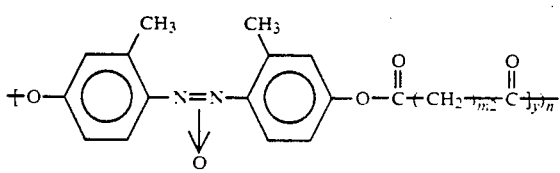
(x + y = 1, m2 = 2-15)
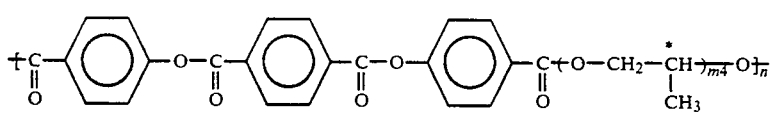 (25)
(m4 = 1-5)
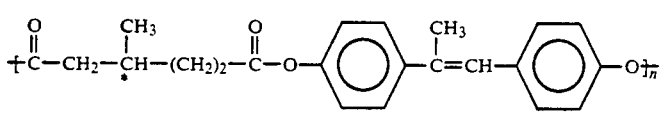 (26)
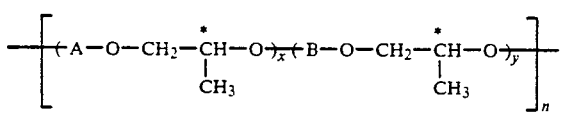 (27)
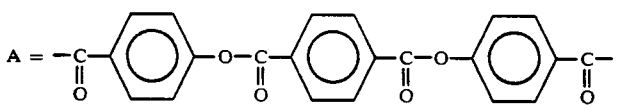
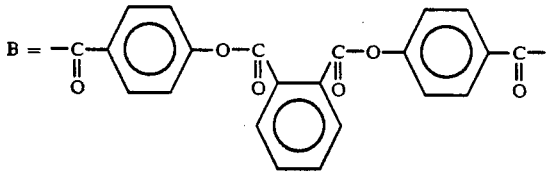
(x + y = 1)
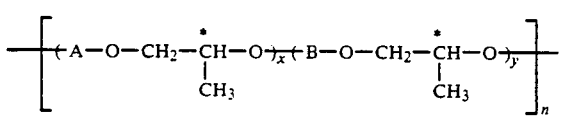 (28)
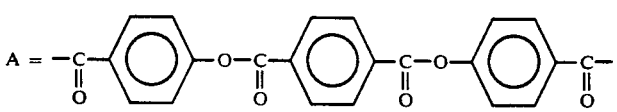

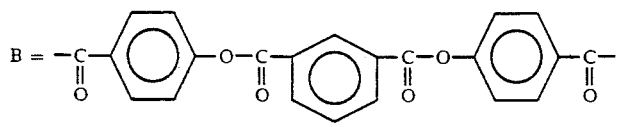

$(x + y = 1)$

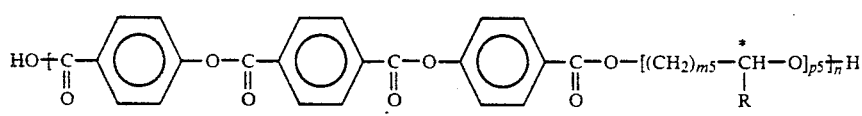  (29)

$(m5 = 1-3, p5 = 1-20)$

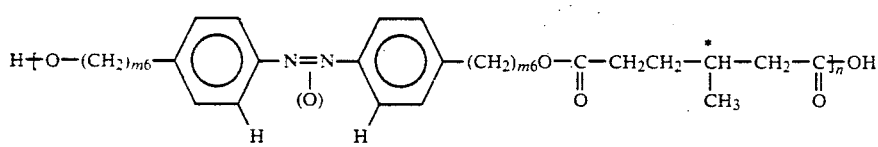  (30)

$(m6 = 0-5)$

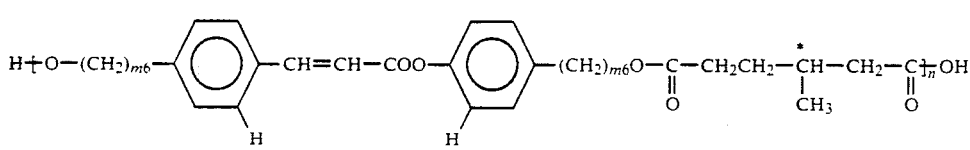  (31)

$(m6 = 0-5)$

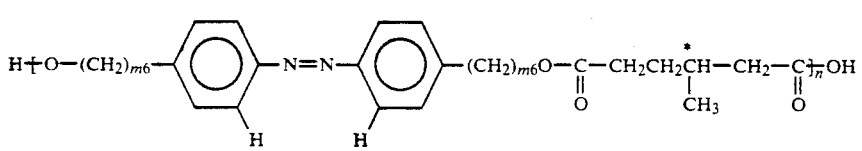  (32)

$(m6 = 0-5)$

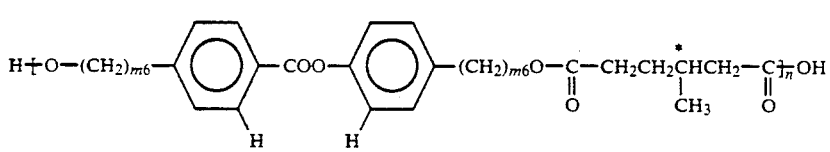  (33)

$(m6 = 0-5)$

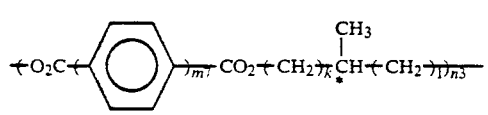  (34)

(wherein $n3 = 5-50000$, $m7 = 1-5$, $k = 1-5$, $l = 1-10$, and $k \neq l$).

The polymer liquid crystal having a chiral center used in the present invention need not necessarily be selected from those described above but can comprise a mesogen unit, a flexible chain and an optically active group, which have been combined into a polymer by the medium of, e.g., an ester bond, amide bond, peptide bond, urethane bond or ether bond. An ester bond may preferably be employed.

Example compounds used as mesogen unit sources may include: dicarboxylic acids, such as terphenyldicarboxylic acid, p-terephthalic acid, biphenyldicarboxylic acid, stilbenedicarboxylic acid, azobenzenedicarboxylic acid, azoxybenzenedicarboxylic acid, cyclohexanedicarboxylic acid, biphenyl etherdicarboxylic acid, biphenoxyethanedicarboxylic acid, and carboxycinnamic acid; diols, such as hydroquinone, dihydroxybiphenyl, dihydroxyterphenyl, dihydroxyazobenzene, dihydroxyazoxybenzene, dihydroxydimethylazobenzene, dihydroxydimethylazoxybenzene, dihydroxypyridazine, dihydroxynaphthalene, dihydroxyphenyl ether, and bis(hydroxyphenoxy)ethane; and hydroxycarboxylic acids, such as hydroxybenzoic acid, hydroxybiphenylcarboxylic acid, hydroxyterphenylcarboxylic acid, hydroxycinnamic acid, hydroxyazobenzenecarboxylic acid, hydroxyazoxybenzenecarboxylic acid, and hydroxystilbenecarboxylic acid.

Example compounds used as flexible chain sources may include: diols, such as methylene glycol, ethylene glycol, propanediol, butandiol, pentanediol, hexanediol, heptanediol, octanediol, nonanediol, decanediol, undecanediol, dodecanediol, tridecanediol, tetradecanediol, pentadecanediol, diethylene glycol, triethylene glycol, tetraethylene glycol, nonaethylene glycol, and tridecaethylene glycol; and dicarboxylic acids, such as malonic acid, succinic acid, glutaric acid, adipic acid, pimelic acid, suberic acid, azelaic acid, and sebacic acid.

Source compounds for providing an optically active group may preferably be difunctional ones, examples of which may include the following: (+)-3-methyl-1,6-hexanediol, (−)-3-methyl-1,6-hexanediol, (+)-3-methyladipic acid, (−)-3-methyladipic acid, (D)-mannitol, (L)-mannitol, (+)-pantothenic acid, (+)-1,2,4-trihydroxy-3,3-dimethylbutane, (−)-1,2-propanediol, (+)-1,2-propanediol, (+)-lactic acid, (−)-lactic acid, (2S,5S)-2-methyl-3-dioxanonane-1,8-diol.

The polymer liquid crystal having a chiral center may be obtained by polycondensation of a mesogen unit-source compound, a flexible chain-source compound and an optically active group-source compound selected from those described above. In this instance, it is possible to use a catalyst in order to increase the degree of polymerization and decrease impurities due to side reactions, etc. In such a case, it is desirable to remove the catalyst after completion of the poly-condensation.

It is necessary for the polymer liquid crystal having a chiral center to be durable through an orientation treatment and treatments for device formation, so that it is desired to have a glass transition temperature of 30° C. or above. Further, in case where a heat treatment is performed for orientation, the glass transition temperature may preferably be 300° C. or below.

The nonlinear optical compound having a second-order molecular nonlinear optical susceptibility of $10 \times 10^{-30}$ esu or above may have a skeleton comprising a $\eta$-electron system and also at least one of an electron-donative group and an electron-attractive group attached to the skeleton.

Such a skeleton comprising a $\eta$-electron system may be provided by an aromatic compound, such as mono-substituted benzene derivative, di-substituted benzene derivative, tri-substituted benzene derivative, tetra-substituted benzene derivative, mono-substituted biphenyl derivative, di-substituted biphenyl derivative, tri-substituted biphenyl derivative, tetra-substituted biphenyl derivative, mono-substituted naphthalene derivative, di-substituted naphthalene derivative, tri-substituted naphthalene derivative, tetra-substituted naphthalene derivative, mono-substituted pyridine derivative, di-substituted pyridine derivative, tri-substituted pyridine derivative, tetra-substituted pyridine derivative, mono-substituted pyrazine derivative, di-substituted pyrazine derivative, tri-substituted pyrazine derivative, tetra-substituted pyrazine derivative, mono-substituted pyrimidine derivative, di-substituted pyrimidine derivative, tri-substituted pyrimidine derivative, tetra-substituted pyrimidine derivative, mono-substituted azulene derivative, di-substituted azulene derivative, tri-substituted azulene derivative, tetra-substituted azulene derivative, mono-substituted pyrrole derivative, di-substituted pyrrole derivative, tri-substituted pyrrole derivative, tetra-substituted pyrrole derivative, mono-substituted thiophene derivative, di-substituted thiophene derivative, tri-substituted thiophene derivative, tetra-substituted thiophene derivative, mono-substituted furan derivative, di-substituted furan derivative, tri-substituted furan derivative, tetra-substituted furan derivative, mono-substituted pyrilium salt derivative, di-substituted pyrilium salt derivative, tri-substituted pyrylium salt derivative, tetra-substituted pyrylium salt derivative, mono-substituted quinoline derivative, di-substituted quinoline derivative, tri-substituted quinoline derivative, tetra-substituted quinoline derivative, mono-substituted pyridazine derivative, di-substituted pyridazine derivative, tri-substituted pyridazine derivative, tetra-substituted pyridazine derivative, mono-substituted triazine derivative, di-substituted triazine derivative, tri-substituted triazine derivative, mono-substituted tetrazine derivative, di-substituted tetrazine derivative, mono-substituted anthracene derivative, di-substituted anthracene derivative, tri-substituted anthracene derivative, or tetra-substituted anthracene derivative.

Examples of the electron donative group attached to such a skeleton as described above may include: amino group, alkyl group (methyl, ethyl, isopropyl, n-propyl, n-butyl, t-butyl, sec-butyl, n-octyl, t-octyl, n-hexyl, cyclohexyl, etc.), alkoxy group (methoxy, ethoxy, propoxy, butoxy, etc.), alkylamino group (N-methylamino, N-ethylamino, N-propylamino, N-butylamino, etc.), hydroxyalkylamino group (N-hydroxymethylamino, N-(2-hydroxyethyl)amino, N-(2-hydroxypropyl)amino, N-(3-hydroxypropyl)amino, N-(4-hydroxybutyl)amino, etc.), dialkylamino group (N,N-dimethylamino, N,N-diethylamino, N,N-dipropylamino, N,N-dibutylamino, N-methyl-N-ethylamino, N-methyl-N-propylamino, etc.), hydroxyalkyl-alkylamino group (N-hydroxymethyl-N-methylamino, N-hydroxymethyl-N-ethylamino, N-hydroxymethyl-N-ethylamino, N-(2-hydroxyethyl)-N-methylamino, N-(2-hydroxyethyl)-N-ethylamino, N-(3-hydroxypropyl)-N-methylamino, N-(2-hydroxypropyl)-N-ethylamino, N-(4-hydroxybutyl)-N-butylamino, etc.), dihydroxyalkylamino group (N,N-dihydroxymethylamino, N,N-di-(2-hydroxyethyl)amino, N,N-di-(2-hydroxypropyl)amino, N,N-di-(3-hydroxypropyl)amino, N-hydroxymethyl-N-(2-hydroxyethyl)amino, etc.), mercapto group and hydroxy group.

On the other hand, examples of the electron attractive group may include: nitro group, cyano group, halogen atom (chlorine, bromine, iodine, fluorine), trifluoromethyl group, carboxyl group, carboxy ester group, carbonyl group and sulfonyl group.

Specific examples of the nonlinear optical compound which may be used in the present invention may o-nitroaniline (1)

p-nitroaniline (2)

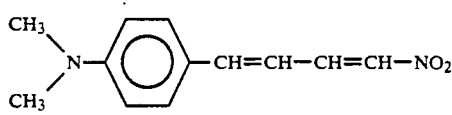 (3)

-continued
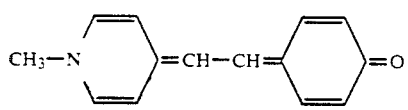 (4)
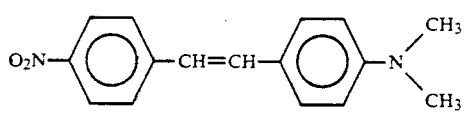 (5)
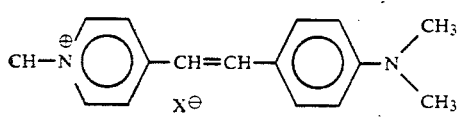 (6)
$(X^\ominus = I^\ominus, IO_3^\ominus, NO_3^\ominus,$ 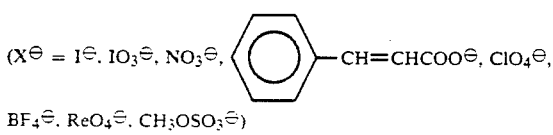
$BF_4^\ominus, ReO_4^\ominus, CH_3OSO_3^\ominus)$
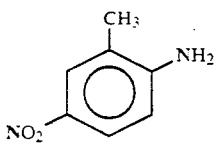 (7)
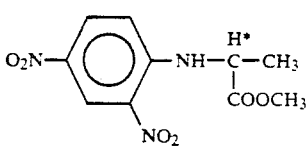 (8)
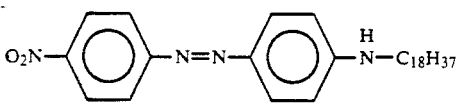 (9)
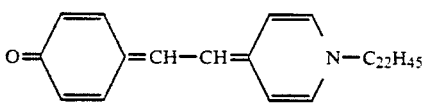 (10)
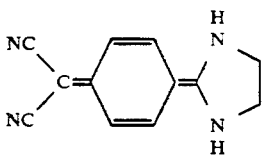 (11)
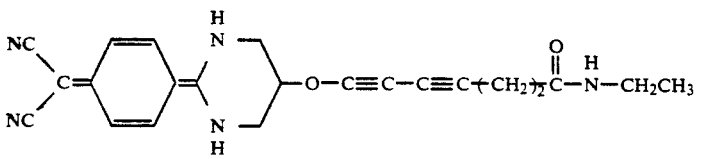 (12)
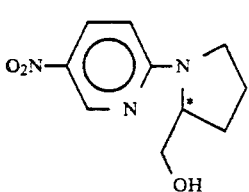 (13)

-continued
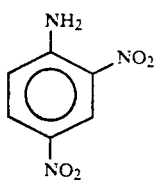 (14)
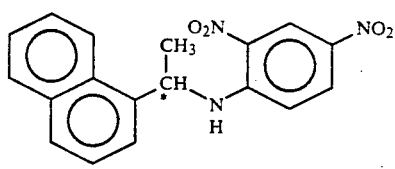 (15)
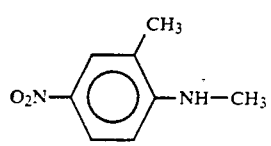 (16)
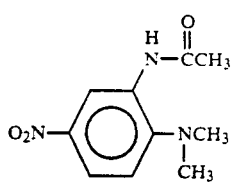 (17)
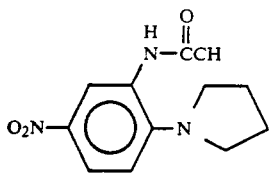 (18)
 (19)
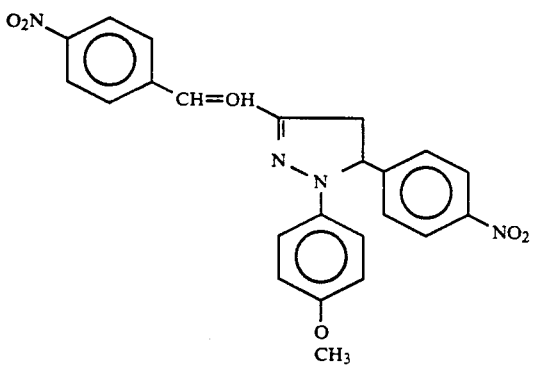 (20)
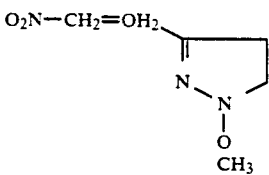 (21)

-continued
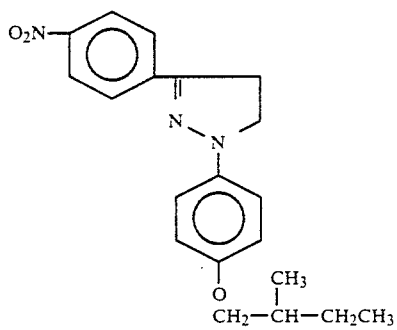 (22)
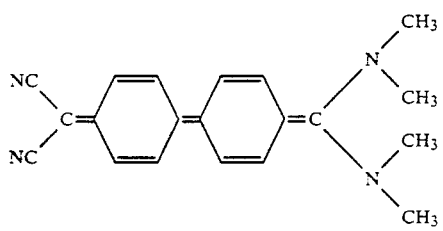 (23)
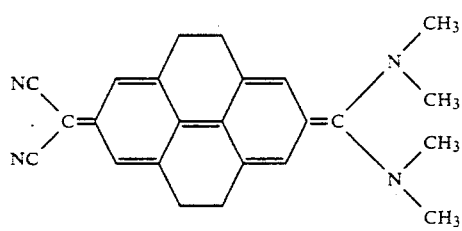 (24)
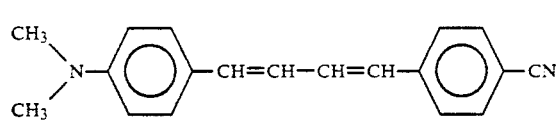 (25)
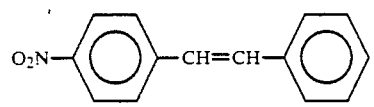 (26)
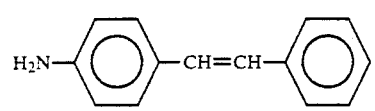 (27)
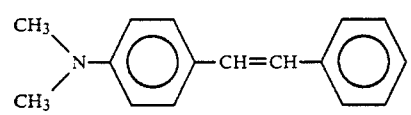 (28)
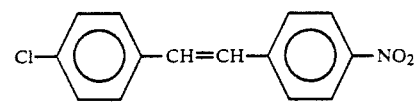 (29)
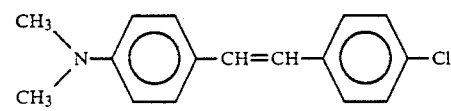 (30)
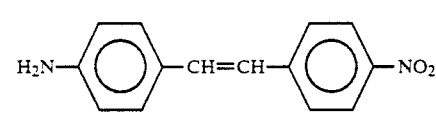 (31)

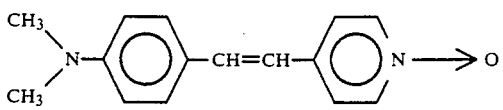

(32)

Poly-γ-benzyl-L-glutamate (33)

The nonlinear optical material according to the present invention may be obtained by uniformly dispersing one or more species of nonlinear optical compounds as represented by the above compound examples having an electron-donative group and/or an electron-attractive group in a polymer liquid crystal having a chiral center, particularly a ferroelectric polymer liquid crystal, as described above.

The uniform dispersion may be attained by dissolving the above-mentioned components in a solvent, mixing the components in heat-melting state or powder blending of the components followed by heat-melting.

The solvent mixture obtained by using a solvent is easy for viscosity adjustment and is suitable for providing a nonlinear optical element in the form of a film because a uniform film can be obtained through spin-coating, dipping, casting, etc.

The heat-melted mixture may be extruded through a die to form an element in the form of fiber or a film, which may be simultaneously stretched to provide a better fiber or film characteristic.

It is possible to combine two or more of the above methods. Further, a good film may be obtained by hot-pressing films obtained by casting to effect multi-mixing.

Such a nonlinear optical element, when used in the form of a film, may have a thickness in the range of 0.01 micron to 100 mm, preferably 0.1 micron–1 mm, while it depends on a desired use thereof. Below 0.01 micron, it is difficult to effectively confine light in the element. Above 100 mm, a desired nonlinear optical effect is accomplished only at a part of the element, so that it is inefficient.

The nonlinear optical compound may be added to the polymer liquid crystal having a chiral center in a proportion of 0.1 wt. %–80 wt. % of the polymer liquid crystal. Below 0.1 wt. %, only a small nonlinear optical effect can be attained. Above 80 wt. %, the compound causes phase separation from the polymer liquid crystal to provide ill effects. It is further desirable that the nonlinear optical compound is added in a proportion of 1–50 wt. %.

In the nonlinear optical material of the present invention, the nonlinear optical compound is uniformly dispersed in the polymer liquid crystal having a chiral center to desirably form a solid solution, a uniform dispersion at a molecular level.

The nonlinear optical material of the present invention shows a large second-order nonlinear effect. Particularly, a nonlinear optical compound like p-nitroaniline which is centrosymmetric in the form of a pure crystal and shows no SHG activity, can show a very large SHG activity when it is blended as a guest with the polymer liquid crystal having a chiral center. One reason therefor may be considered that between the polymer liquid crystal deprived of an inversion symmetrical center and the guest compound molecule, there is acting such a strong interaction as to obstruct the guest molecule from having a centrosymmetrical structure.

Further, when a ferroelectric polymer liquid crystal is used, it has a high stability in retaining an orientation state because of its polymer characteristic. A low-molecular weight ferroelectric liquid crystal having a similar liquid crystal structure deprived of a symmetry center has a property of retaining its orientation state but the orientation state can be disordered at application of a mechanical shock. In this respect, a ferroelectric polymer liquid crystal is very advantageous.

The nonlinear optical material of the present invention may desirably be formed into a waveguide film or fiber as a nonlinear optical element on a substrate and subjected to an orientation treatment so as to allow phase matching thereby providing a nonlinear optical device of the present invention.

Further, the nonlinear optical material of the present invention may be applied on a substrate of an arbitrary material, such as glass, plastic or metal, optionally provided with a transparent electrode of ITO or a patterned electrode, to constitute a recording medium or a display device.

In order to provide a layer of the nonlinear optical material of the present invention formed on a substrate with an orientation or alignment characteristic, the following methods may be applied for example to the substrate:

(1) Homogeneous orientation or aligning treatment (for aligning the molecular axis of the polymer liquid crystal in parallel with the substrate surface).

① Rubbing method:
A substrate is coated with an alignment control film by forming a film of, e.g., an inorganic insulating substance, such as silicon monoxide, silicon dioxide, aluminum oxide, zirconia, magnesium fluoride, cerium oxide, cerium fluoride, silicon nitride, silicon carbide or boron nitride; or an organic insulating substance, such as polyvinyl alcohol, polyimide, polyamide-imide, polyesterimide, polyparaxylylene, polyester, polycarbonate, polyvinyl acetal, polyvinyl chloride, polyamide, polystyrene, cellulosic resin, melamine resin, urea resin or acrylic resin, by application of a solution, vapor deposition or sputtering.

The alignment control film formed as a film of an inorganic insulating substance or organic insulating substance as described above may then be rubbed in one direction with velvet, cloth or paper on the surface thereof.

② Oblique vapor deposition:
An oxide such as SiO, a fluoride, or a metal such as Au or Al or its oxide, is vapor-deposited on a substrate in a direction forming an angle inclined with respect to the substrate.

③ Oblique etching:
An organic or inorganic insulating film as described in 1 above formed on a substrate is etched by radiation with an ion beam or oxygen plasma incident in an oblique direction.

④ Use of a stretched polymer film:

A film of obtained by stretching a film of a polymer such as polyester or polyvinyl alcohol also shows a good orientation characteristic.

⑤ Grating:

Grooves are formed on a substrate surface by photolithography, stampling or injection, so that liquid crystal molecules are aligned along the grooves. (2) Homeotropic orientation or aligning treatment (for aligning the molecular axis of the polymer liquid crystal perpendicularly to the substrate surface):

① Formation of a homeotropic alignment film:

A substrate surface is coated with a layer of an organic silane, lecithin or PTFE (polytetrafluoroethylene) having a homeotropic orientation characteristic.

② Oblique vapor deposition:

Oblique vapor deposition is performed on a substrate while the substrate is rotated and the vapor deposition angle is appropriately selected in the oblique vapor deposition mentioned in (1)—② above to provide a homeotropic orientation characteristic. Further, it is also possible to apply a homeotropic aligning agent as shown in ① above after the oblique vapor deposition.

Various orientation or aligning treatments as described above may be used singly or in combination of two or more methods.

An orientation or aligning treatment may also be effected by stretching of a film or fiber of the nonlinear optical material under the action of a mechanical force, roller stretching, shearing, or application of an electric field or magnetic field to provide a nonlinear optical element in addition to the interfacial control with the substrate as described above. The thus obtained nonlinear optical element may be applied on a substrate.

It is further preferred that such a nonlinear optical element is supplied with a DC electric field simultaneously with the above-mentioned orientation treatment or separately at a temperature of liquid crystal phase or above followed by cooling to below the liquid crystal phase temperature under continued application of the electric field. The DC electric field may be applied by providing electrodes on both sides of the film, corona discharge, etc.

In case where the nonlinear optical element of the present invention is composed from a ferroelectric polymer liquid crystal, it shows a bistability under the interaction with the substrate surfaces in the absence of an electric field, thus showing a good memory characteristic. In order to realize the bistability in the absence of an electric field, the nonlinear optical element is formed in a thickness smaller than the helical pitch in the chiral smectic phase of the ferroelectric polymer liquid crystal to release or suppress the helical structure. More specifically, the thickness may preferably be 50 microns or less. In this instance, the nonlinear optical element can be subjected to stable and high-speed switching between the bistable states by an electric field, so that the issuing SHG signal can be modulated accordingly. This is an advantage of the nonlinear optical element of the present invention because most of the conventional SHG elements can only cause SHG and cannot easily modulate SHG signals by simply using an electric field. Thus, the nonlinear optical device of the present invention can be used as a high-speed optical modulation element in a future optical computer.

Hereinbelow, the present invention will be explained in more detail based on Examples.

EXAMPLE 1

(a) 9.9 g of (+)-3-methyladipoyl chloride was dissolved in 100 ml of dry 1,2-dichloroethane, and thereto a solution of 17.6 g of hydroquinone in 50 ml of dry pyridine was added dropwise. After the addition, the mixture was reacted for 48 hours, and 1,2-dichloroethane was distilled off. Then, the product was washed with water and recrystallized from toluene to obtain 9 g (yield: 50%) of a compound represented by the following structural formula (I) (m.p.: 110° C.):

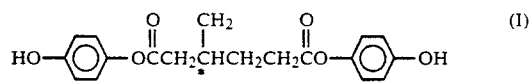

Then, 3.0 g of terephthaloyl chloride was dissolved in 200 ml of dry dimethylformamide (DMF), and a solution of 3.5 g of the above compound (I) in 30 ml of dry pyridine was added thereto dropwise, followed by 50 hours of reaction and then 2 hours of reaction at 80° C. The product was re-precipitated from water-acetone to obtain a polymer liquid crystal.

(b) The polymer liquid crystal and 10 wt. % of 4'-nitro-4-dimethylamino-stilbene were dissolved in DMF, and the solution was applied on an ITO electrode-coated glass substrate, followed by drying at 120° C. and 5 hours of heat-treatment at 200° C. to form an about 0.1 mm-thick nonlinear optical film.

(c) The above nonlinear optical film was illuminated with laser beam having a wavelength of 1.9 micron obtained by difference frequency of Nd:YAG laser light and dye laser light, whereby an SHG intensity about 0.2 times that of powdery urea was observed by a method similar to the powder method.

EXAMPLE 2

(a) An aluminum foil was applied on the nonlinear optical film obtained in (b) of Example 1. The resultant laminate was heated to 300° C. and cooled while applying a DC voltage of 1 KV between the ITO and aluminum electrodes.

(b) Then, the nonlinear optical film was illuminated with a 1.9 micron-laser beam, whereby an SHG intensity of about two times that of powdery urea was observed by a method similar to the powder method.

EXAMPLE 3

(a) A polymer liquid crystal having a cholesterol skeleton represented by the following formula (II) was synthesized and dissolved in DMF together with 5 wt. % of Disperse Red I represented by the following formula (III):

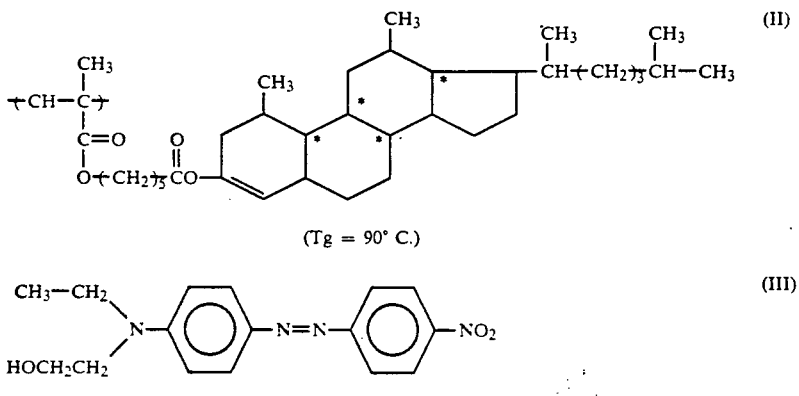

(Tg = 90° C.)

The solution was applied on an ITO electrodecoated glass substrate by spin coating and dried at 80° C. to form a nonlinear optical film.

(b) The nonlinear optical film was illuminated with 1.9 micron-laser beam, whereby an SHG intensity of 0.5 times that of powdery urea was observed by a method similar to the powder method.

COMPARATIVE EXAMPLE 1

Polymethyl methacrylate and 5 wt. % of Disperse Red I used in Example 3 were dissolved in DMF, and the solution was applied on an ITO-coated glass substrate to form a film. The film was illuminated with 1.9 micron-laser beam for measurement of an SHG intensity similarly as in Example 3, whereas no SHG was observed.

EXAMPLE 4

A nonlinear optical device 1 as shown in FIG. 1 was prepared in the following manner. A 1 mm-thick glass plate coated with an ITO film was further coated with a 5000 Å-A-thick vapor-deposited Al to form a lower electrode 12. On the electrode 12, a polyamic acid solution ("PIQ" available from Hitachi Kasei Kogyo K.K.; Non-volatile matter content: 3 wt. %) was applied by spin coating and heated for 30 minutes at 120° C., for 60 minutes at 200° C. and for 30 minutes at 350° C. to form a polyimide alignment film 13, which was then rubbed to be provided with a uniaxial alignment characteristic. Then, on the alignment film 13, the solution of the nonlinear optical material prepared in Example 3 was applied by spin coating and dried to form a 1 micron-thick film 14 constituting a nonlinear optical waveguide film, on which was further formed an upper electrode 15 of a 1000 Å-thick Al film by vapor deposition. Then, the laminate was heated to 200° C. and then cooled while a DC voltage of 100 V was applied between the lower electrode 12 and the upper electrode 15. The thus prepared optical device 1 of the present invention was set in an optical system as shown in FIG. 1 and illuminated with a 1.9 micron-laser beam from a laser 16 by the medium of a modulator 16 and a lens 18, whereby SHG was observed through a photomultiplier.

SYNTHESIS EXAMPLE 1

A ferroelectric polymer liquid crystal of the present invention, poly{2-hexyloxypropyl 4-[4'-(11-acryloyloxyundecanyloxy)benzoyloxy]-benzoate}, represented by the following formula (IV), was prepared in the following manner.

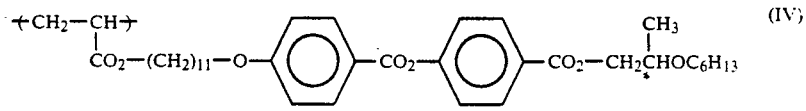

Step 1)
Synthesis of 2-hexyloxypropyl 4-hydroxybenzoate
3.2 g of 4-hydroxybenzoic acid and 18.7 g of optically active (+)-2-hexyloxypropanol were heat-refluxed together with 1 ml of sulfuric acid in benzene for 20 hours. The reaction liquid was condensed and purified by column chromatography to obtain 6.2 g of the above product *yield: 91%).

Step 2)
Synthesis of 4-(11-hydroxyundecanyloxybenzoic acid
5.4 g of p-hydroxybenzoic acid was added to ethanol-dioxane mixture solvent, and an aqueous solution containing 6.6 g of potassium hydroxide was added thereto. Further, 12.5 g of 11-bromoundecanol was added dropwise thereto, followed by 12 hours of heat-refluxing. The reaction mixture was acidified, extracted with ethyl acetate and purified by column chromatography to obtain 7.3 g of the above-captioned product (yield: 53%).

Step 3)
Synthesis of 4-(11-acryloyloxyundecanyloxy)benzoic acid
6.4 g of 4-(11-hydroxyundecanyloxy)benzoic acid and 5.8 g of acrylic acid were heat-refluxed in the pressure of hydroquinone in benzene for 80 hours. After distilling off the solvent, the product was purified by column chromatography to obtain 2.9 g of the objective product (yield: 38%).

Step 4)
Synthesis of 2-hexyloxypropyl 4-[4'-(11-acryloxyundecanyloxy)benzoyl]benzoate
1.6 g of 4-(11-acryloyloxyundecanyloxy)benzoic acid was heat-refluxed for 3 hours in 20 ml of thionyl chloride in the pressure of 2,6-di-t-butylphenol. An excess of the thionyl chloride was distilled off, and 20 ml of anhydrous THF and 5 ml of triethylamine were added to the system, followed by addition of 1.0 g of 2-hexyloxypropyl 4-hydroxybenzoate at 5° C. and 4 hours of stirring at 50° C. After being acidified, the product was extracted with ethyl acetate and purified by column chromatography to obtain 1.5 g of the objective product (yield: 48%).

Polymerization step)

0.500 g of 2-hexyloxypropyl 4-[4'-(11-acryloyloxyundecanoyloxy)benzoyl]benzoate and 3 mol % of azobisisobutyronitrile were added to 5 ml of dry toluene and degassed under freezing, followed by polymerization for 24 hours at 60° C. The product was repeatedly re-precipitated from methanol to obtain 0.32 g (yield: 64%) of the objective polymer, which showed the following physical properties.

Mn(number-average molecular weight)=8700
Mw(weight-average molecular weight)=10600
Phase transition characteristic:

Chiral smectic C $\xrightarrow{12°\text{ C.}}$ smectic A $\xrightarrow{72°\text{ C.}}$ isotropic phase

SYNTHESIS EXAMPLE 2

A ferroelectric polymer liquid crystal of the present invention, poly{2-methylbutyl 4'-(6-acryloyloxyhexyloxy)biphenyl-4-carboxylate, represented by the following formula (V) was synthesized in the following manner.

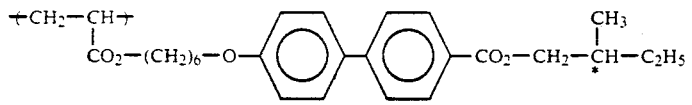

Step 1)

Synthesis of 2-methylbutyl 4'-hydroxybiphenyl-4-carboxylate 10.6 g of 4'-hydroxybiphenyl-4-carboxylic acid and 18.7 g of (+)-2-methylbutanol were heat-refluxed for 20 hours in benzene together with 1 ml of sulfuric acid. The mixture was subjected to filtration, condensation acid recrystallization to obtain 11.0 g of the objective product (yield: 83%).

Step 2)

Synthesis of 2-methylbutyl 4'-(6-hydroxyhexyloxy)-biphenyl-4-carboxylate 2.84 g of 2-methylbutyl 4'-hydroxybiphenyl-4-carboxylate, 4.14 g of potassium carbonate, 4.10 g of 6-chloro-1-hexanol and 4.28 g of potassium iodide were heat-refluxed for 48 hours in acetone. The mixture was subjected to filtration, condensation and purification by column chromatography to obtain 1.31 g of the objective product (yield: 34%).

Step 3)

Synthesis of 2-methylbutyl 4'-(6-acryloyloxyhexyloxy)biphenyl-4-carboxylate 1.60 g of 2-methylbutyl 4'-(6-hydroxyhexyloxy)-biphenyl-4-carboxylate was added to a mixture of dry benzene/triethylamine, and 4.53 g of acryloyl chloride was added dropwise thereto at 5° C. in the pressure of 2,6-di-t-butylphenol, followed by 2 hours of stirring. After being acidified, the product was extracted with ethyl acetate and purified by column chromatography to obtain 1.20 g (yield: 66%) of the objective product.

Polymerization step)

1.20 g of 2-methylbutyl 4'-(6-acryloyloxyhexyloxy)-biphenyl-4-carboxylate and 3 mol % of AIBN were added to 12 ml of dry toluene and degassed under freezing, followed by polymerization for 24 hours at 60° C. The product was repeatedly re-precipitated from methanol to obtain 1.02 g of the objective polymer, which showed the following physical properties:

Mn=9200, Mw=12500,
Phase transition characteristic:

glass $\xrightarrow{35°\text{ C.}}$ smectic phase (un-identified) $\xrightarrow{47°\text{ C.}}$ chiral smectic C phase $\xrightarrow{74°\text{ C.}}$ smectic A phase $\xrightarrow{96°\text{ C.}}$ isotropic phase

[Measurement of SHG intensity]

Nonlinear optical materials were prepared by using the above prepared polymer liquid crystals and subjected to measurement of SHG intensity for evaluating nonlinear optical effect in the following examples.

In the measurement, an Nd-YAG laser was used as a light source for illumination with a laser light having a wavelength of 1.06 micron (power: 17 mJ/pulse), and the resultant SHG light (0.53 micron) was observed through a photomultiplier by a method similar to the powder method.

EXAMPLE 5

Poly{2-hexyloxypropyl 4-[4'-(11-acryloxyloxyundecanyloxy)benzoyl]benzoate} and p-nitroaniline in proportions of 75 wt. % and 25 wt. %, respectively, were uniformly mixed under melting at 170° C. and cooled to room temperature to form a nonlinear optical material in the form of a solid solution. The solid solution was illuminated with the Nd-YAG laser light, whereby an SHG intensity of about 25 times that of powdery urea was observed through a photomultiplier. The nonlinear optical activity of the material was retained without change even after three months.

EXAMPLE 6

The nonlinear optical mixture prepared in Example 5 was dissolved in dimethylformamide and case into a film.

The resultant film of a nonlinear optical material in the form of a solid solution was illuminated with the Nd-YAG laser light, whereby an SHG intensity of about 18 times that of powdery urea was observed. The SHG activity caused no change even after 3 months.

EXAMPLE 7

Poly{2-methylbutyl 4'-(6-acryloyloxyhexyloxy) biphenyl-4-carboxylate} and p-nitroaniline in proportions of 75 wt. % and 25 wt. %, respectively, were uniformly mixed under melting at 170° C. and cooled to room temperature to form a nonlinear optical material in the form of a solid solution. The solid solution was illuminated with the Nd-YAG laser light, whereby and SHG intensity of about 17 times that of powdery urea was observed through a photomultiplier. The nonlinear optical activity of the material was retained without change even after two months.

EXAMPLE 8

The nonlinear optical mixture prepared in Example 7 was dissolved in TMF and cast into a film.

The resultant film of a nonlinear optical material in the form of a solid solution was illuminated with the Nd-TAG laser light, whereby an SHG intensity of about 15 times that of powdery urea was observed. The SHG activity caused no change even after 5 2 months.

EXAMPLE 9

A nonlinear optical device 1 as shown in FIG. 1 was prepared in the following manner. A 1 mm-thick glass plate coated with an ITO film was further coated with a 5000 Å-thick vapor-deposited Al to form a lower electrode 12. On the electrode 12, a polyamic acid solution ("PIQ" available from Hitachi Kasei Kogyo K.K., Non-volatile matter content: 3 wt. %) was applied by spin coating and heated for 30 minutes at 120° C., for 60 minutes at 200° C. and for 30 minutes at 350° C. to form a polyimide alignment film 13, which was then rubbed to be provided with a uniaxial alignment characteristic.

Then, on the alignment film 13, the solution of the nonlinear optical material prepared in Example 6 was applied by spin coating and dried to form a 1 micron-thick film 14 constituting a nonlinear optical waveguide film, on which was further formed an upper electrode 15 of a 1000 Å-thick Al film by vapor deposition. Then, the laminate was heated to 130° C. and then cooled while a DC voltage of 100 V was applied between the lower electrode 12 and the upper electrode 15.

The thus prepared optical device 1 of the present invention was set in an optical system as shown in FIG. 1 and illuminated with a 1.06 micron-laser beam from a laser 16 by the medium of a modulator 16 and a lens 18, whereby SHG was observed through a photomultiplier.

As described above, the nonlinear optical material of the present invention shows a large nonlinear optical effect based on the presence of a chiral center possessed by the polymer liquid crystal used as the host and can be easily oriented to provide a large nonlinear optical effect. Further, a nonlinear optical device can be easily formed by orienting the nonlinear optical material to form a nonlinear optical element, showing an excellent characteristic.

What is claimed is:

1. A nonlinear optical material, comprising:
a ferroelectric polymer liquid crystal and a nonlinear optical compound forming a solid solution, wherein said nonlinear optical compound has a skeleton comprising a $\pi$-electron system and at least one member selected from the group consisting of electron-donating and electron-attracting groups, said nonlinear optical compound having a second order hyperpolarizability of at least $10 \times 10^{-30}$ e.s.u.; and said ferroelectric liquid crystal being a side chain-type polymer having a mesogen unit in its side chain represented by

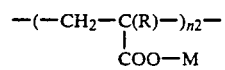

wherein n2 is 5-5000, R is H, Cl or CH₃, and M is a mesogen unit including an asymmetric carbon atom.

2. A material according to claim 1, wherein said nonlinear optical compound has a second-order hyperpolarizability of $20 \times 10^{-30}$ e.s.u. or higher.

3. A nonlinear optical device, comprising an optical member comprising a nonlinear optical material according to claim 1, said optical material being in an oriented form.

4. A nonlinear optical apparatus, comprising a nonlinear optical device according to claim 3, and a laser light source.

5. A nonlinear optical material according to claim 1, wherein said side chain-type polymer is represented by one of the following formulae:

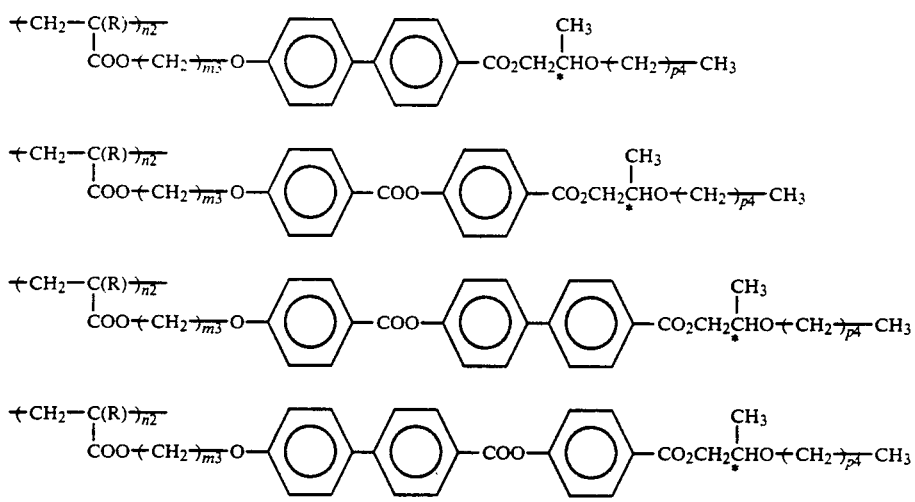

wherein C* is asymmetric carbon atom, n2 is 5-5000, R is H, Cl or CH₃, m3=0-30, and p4=1-20.

6. A nonlinear optical material according to claim 1, wherein M is denoted by:

wherein $R_1$ is $+CH_2\}_{\overline{m3}}$, m3 = 0-30,

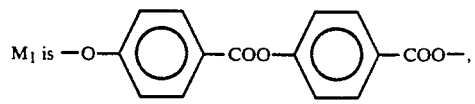

-continued
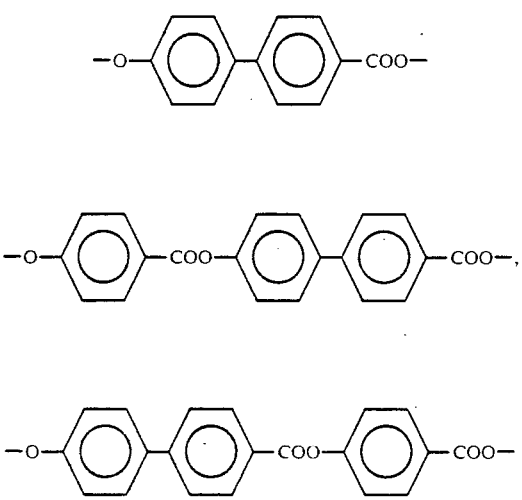
-continued
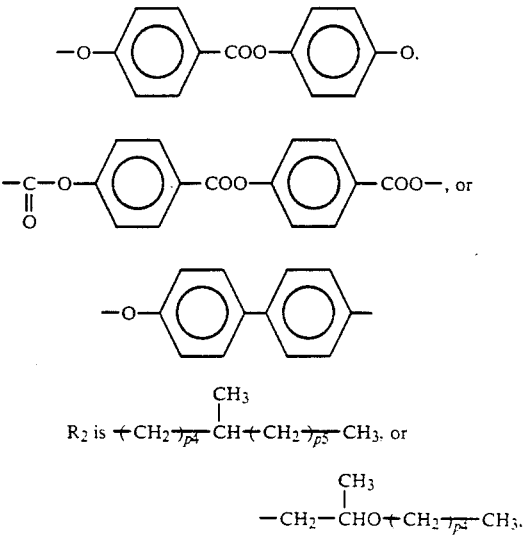
$p4 = 1–20$ and $p5 = 1–20$.
* * * * *

UNITED STATES PATENT AND TRADEMARK OFFICE
CERTIFICATE OF CORRECTION

PATENT NO. : 5,011,623
DATED     : April 30, 1991
INVENTOR(S) : KAZUO YOSHINAGA, ET AL.

It is certified that error appears in the above-identified patent and that said Letters Patent is hereby corrected as shown below:

On the title page

IN [56] REFERENCES CITED

OTHER PUBLICATIONS, "Shtykou" should read --Shtykov-- and "1385-1389" should read --1385-1389.--.

COLUMN 1

Line 14, "laser" should read --a laser--.
    Line 25, "such" should read --as such--.
    Line 38, "respects" should read --respect--.
    Line 61, "U.S. Pat. No. 442887" should read --U.S. Pat. No. 4,428,873--.

COLUMN 2

Line 34, "i.d.," should read --i.e.,--.
    Line 42, "(Meredity," should read --(Meredith,--.

COLUMN 3

Line 55, "DRAWINGS" should read --DRAWING--.

COLUMN 4

Line 4, "two fold" should read --two-fold--.
    Line 15, "Meredity," should read --Meredith,--.
    Line 31, "has" should read --have--.

UNITED STATES PATENT AND TRADEMARK OFFICE
CERTIFICATE OF CORRECTION

PATENT NO. : 5,011,623
DATED : April 30, 1991
INVENTOR(S) : KAZUO YOSHINAGA, ET AL.

It is certified that error appears in the above-identified patent and that said Letters Patent is hereby corrected as shown below:

COLUMN 5

Formula 2, "$-(CH_2-CH_3)_{\overline{n1}}$-" should read $--(Ch_2-C(CH_3))_{\overline{n1}}--$.

COLUMN 15

Line 15, "(2S,5S)-2-methyl-3-dioxanonane-1,8-diol." should read --(2S,5S)-2-methyl-3-oxahexane-1,5-diol, (2S,5S,8S)-2,5-dimethyl-3,6-dioxanonane-1,8-diol.--.

COLUMN 16

Line 57, "may" should read --may include the following compounds (1)-(33):--.

COLUMN 24

Line 64, "1" should read --①--.

COLUMN 25

Line 1, "of" (first occurrence) should be deleted.
Line 8, "(2) Homeo-" should read --¶ (2) Homeo- --.
Line 25, "① above" should read --(2) - ① above--.

UNITED STATES PATENT AND TRADEMARK OFFICE
CERTIFICATE OF CORRECTION

PATENT NO. : 5,011,623

DATED : April 30, 1991

INVENTOR(S) : KAZUO YOSHINAGA, ET AL.

It is certified that error appears in the above-identified patent and that said Letters Patent is hereby corrected as shown below:

COLUMN 26

Line 43, "laser" should read --a laser-- and "micron" should read --microns--.

COLUMN 27

Line 18, "electrodecoated" should read --electrode-coated--.

Line 47, "5000 Å-A-thick" should read --5000 Å-thick--.

COLUMN 28

Line 38, "*yield: 91%)." should read --(yield: 91%).--.

Line 40, "4-(11-hydroxyundecanyloxybenzoic acid" should read --4-(11-hydroxyundecanyloxy)benzoic acid--.

COLUMN 29

Line 24, "yloxy)biphenyl-4-carboxylate," should read --yloxy)biphenyl-4-carboxylate},--.

COLUMN 30

Line 45, "case" should read --cast--.

Line 55, "porpor-" should read --propor- --.

Line 60, "and" should be deleted.

UNITED STATES PATENT AND TRADEMARK OFFICE
CERTIFICATE OF CORRECTION

PATENT NO. : 5,011,623
DATED : April 30, 1991
INVENTOR(S) : KAZUO YOSHINAGA, ET AL.

It is certified that error appears in the above-identified patent and that said Letters Patent is hereby corrected as shown below:

COLUMN 31

Line 3, "Nd-TAG" should read --Nd-YAG--.
Line 5, "5 2 months" should read --2 months--.
Line 53, "modulator 16" should read --modulator 17--.

COLUMN 32

Line 53, "asymmetric" should read --an asymmetric--.

Signed and Sealed this

First Day of December, 1992

Attest:

DOUGLAS B. COMER

Attesting Officer

Acting Commissioner of Patents and Trademarks